United States Patent [19]

Concannon

[11] 4,014,834

[45] Mar. 29, 1977

[54] AQUEOUS SOLUTIONS OF POLYAMIDE ACIDS WHICH CAN BE PRECURSORS OF POLYIMIDE POLYMERS

[75] Inventor: Thomas Patrick Concannon, Newtown Square, Pa.

[73] Assignee: E. I. Du Pont de Nemours and Company, Wilmington, Del.

[22] Filed: Feb. 4, 1975

[21] Appl. No.: 546,998

[52] U.S. Cl. .................... 260/29.2 N; 260/857 PA
[51] Int. Cl.$^2$ .................... C08J 3/06; C08L 79/08
[58] Field of Search ............. 260/29.2 N, 29.2 UA, 260/857 PA

[56] References Cited

UNITED STATES PATENTS

| | | | |
|---|---|---|---|
| 3,448,068 | 6/1969 | Holub et al. | 260/29.2 N |
| 3,507,765 | 4/1970 | Holub et al. | 260/29.2 N |
| 3,528,937 | 9/1970 | Reynolds et al. | 260/29.2 N |
| 3,541,036 | 11/1970 | Libackyj | 260/29.2 N |
| 3,663,728 | 5/1972 | Hoback et al. | 260/29.2 N |
| 3,804,793 | 4/1974 | McQuade | 260/29.2 N |
| 3,891,601 | 6/1975 | Peterson et al. | 260/29.2 N |

OTHER PUBLICATIONS

Encyclopedia of Chem. Tech., Kirk–Othmer, second ed. supplement vol. A–U, 1971, pp. 889–910.

*Primary Examiner*—Allan Lieberman

[57] ABSTRACT

High solids, low viscosity, stable aqueous solutions of polyamide acids, which are precursors of polyimide polymers, can be prepared from the polyamide acids, a tertiary amine, a coalescing agent such as N-methylpyrrolidone, and a viscosity reducing agent such as furfuryl alcohol. These aqueous solutions are capable of depositing a uniform film and of being cured into polyimides.

11 Claims, No Drawings

AQUEOUS SOLUTIONS OF POLYAMIDE ACIDS WHICH CAN BE PRECURSORS OF POLYIMIDE POLYMERS

BACKGROUND OF THE INVENTION

Polyamide acids may be defined as polymers formed by the polycondensation reaction of a. amines having two amino groups, each of which is primary or secondary in nature, attached to separate carbon atoms, with b. organic acids (or derivatives or organic acids capable of forming amides) containing three or more carbonyl groups, at least two of which are attached to adjacent carbon atoms, the conditions of the polycondensation being such that only two of the amide forming groups take part in the reaction, thereby yielding a polyamide having unreacted carboxylic groups pendent from the repeating units of the polymer chain.

One of the polymerization processes useful in the preparation of these polyamide acids is generally carried out in an organic liquid which is usually a solvent for at least one reactant and contains functional groups other than primary or secondary amino or carboxyl or anhydride groups. The process has been described for example in Edwards, U.S. Pat. No. 3,179,614, issued Apr. 20, 1965.

The polyamide acid compositions can be formed into useful structures by extruding through dies, casting as films, coating on substrates or by similar processing. They can be cured into polyimide polymers. The polyamide acid compositions in solvents can also be used as filled or pigmented coatings for a variety of substrates.

Polyamide acids, whether dissolved in organic liquids or without solvents, suffer from the disadvantage that when exposed to water or even moisture from the atmosphere they tend to undergo some hydrolytic degradation.

To overcome such hydrolytic instability, and to provide polyamide acids in solutions containing significant amounts of water, such polyamide acids are converted into salts with organic bases, preferably tertiary amines. If amines other than tertiary amines are utilized in the salt forming reactions with the polyamide acids, the hydrolytic instability is not totally overcome.

As practiced by the prior art, as for example in Reynolds, British Patent Specification No. 1,207,577, published Oct. 7, 1970, a tertiary amine such as trimethyl amine is utilized in approximately stoichiometric amounts corresponding to the polyamide acid. The amine salt of the acid is prepared in an aqueous alcoholic solution and films are cast from this solution. Such solutions, however, can only be prepared at low non-volatile content without becoming excessively viscous. Also, only very thin films can be obtained by this method of the prior art and film quality is often poor. The films prepared this way are often bubbly and opaque since the polyamide acid and the polyimide, generated during the film forming process through the loss of amine and water, are insoluble in the solution of the polyamide acid salt. These insoluble film portions blister during further solvent loss giving rise to imperfect, opaque films.

It would be advantageous to be able to prepare high solids, low viscosity stable aqueous solutions of polyamide acids. When dealing with organic solutions of these polyamide acids they have to be protected from atmospheric moisture as mentioned above. Also, the increased awareness of the environmental hazards of allowing organic solvent vapors to enter the atmosphere dictates the diminished use or elimination of such solvents wherever possible. It is also a practical necessity to have a solution as high in nonvolatile content as possible and to obtain this goal within reasonable viscosity limits. This way it is possible for example to deposit fims of a desired thickness without having to repeat this operation several times.

This invention affords stable aqueous solutions of polyamide acid precursors of polyimides at up to 70% solids content, at viscosities not exceeding 10,000 centipoises at 50° C. This is accomplished by preparing solutions of polyamide acid salts of such acids with tertiary amines; wherein said solutions also contain a viscosity reducing agent such as furfuryl alcohol and a coalescing agent such as N-methylpyrrolidone. These solutions of the polyamide acid salts are capable of depositing uniform films curable to polyimide polymers.

SUMMARY OF THE INVENTION

Aqueous solutions of polyamide acids which can be precursors of polyimide polymers consist essentially of:

A. 10–70% by weight, based on the total solution, of a polyamide acid prepared from diprimary amine and a tricarboxylic acid mono-anhydride or a tetracarboxylic acid dianhydride or from a dicarboxylic acid and a diisocyanate; wherein the acid is neutralized with a tertiary amine in an amount at least stoichiometrically equivalent to all of the free carboxylic acid of the polyamide acid;

B. 5–25% by weight, based on the total solution, of a viscosity reducing agent such as furfuryl alochol; and C. 5–35% by weight, based on the total solution, of a coalescing agent such as N-methylpyrrolidone, wherein such solutions are capable of being processed by any of the conventional processing methods. The polyamide acid salt solutions can be used as is or in a pigmented or filled form or processed to the final cured polyimide state.

DESCRIPTION OF THE INVENTION

Stable aqueous compositions containing salts of polyamide acids with tertiary amines, at solids contents up to 70% by weight, based on the total solution, and at a viscosity not exceeding 10,000 centipoises at 50° C, are made possible by the use of viscosity reducing agents and coalescing agents. Such solutions are useful, for example, for casting films, coating various substrates with pigmented or the unmodified solutions or, in general, as precursors to polyimide polymers.

The polyamide acids utilized in this invention are known in the prior art and have been described by several patents. They can be prepared, for example, by the method shown in Edwards, U.S. Pat. No. 3,179,614, issued Apr. 20, 1965.

The polyamide acids are of the general structure:

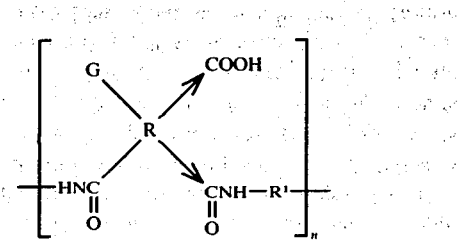

wherein the → denotes isomerism so that in any recurring unit within the polymeric structure the groups to which the arrows point may exist as shown or in an interchanged position, wherein G is H or —COOH, wherein R is an organic tetravalent radical containing at least two carbon atoms and no more than 2 carbonyl groups of each polyamide acid unit are attached to any one carbon atom, wherein R¹ is a divalent radical containing at least two carbon atoms, the amide groups of adjacent polyamide acid units are attached to separate carbon atoms of said divalent radical, and wherein n is an integer sufficient to provide a polyamide acid having an inherent viscosity of at least 0.1, preferably 0.3–5.0, as measured as a 0.5% solution in N,N-dimethylacetamide at 30° C.

Polyamide acids can also be prepared from dicarboxylic acids and organic diisocyanates (as shown for example in Fang, U.S. Pat. No. 3,657,380 and which is hereby incorporated by reference) or from a mixture of dicarboxylic acids with anhydrides of tri- and/or tetracarboxylic acids and organic diisocyanates (as shown for example in Keating et al., U.S. Pat. No. 3,843,587, and which is hereby incorporated by reference).

The polyamide acids are prepared, for example, from at least one diprimary amine of the general formula:

$$H_2N-R^1-NH_2$$

and at least one tricarboxylic acid mono-anhydride or tetracarboxylic acid dianhydride having the structural formulae

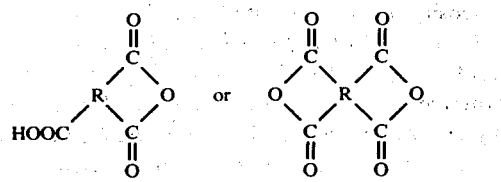

where R and R¹ are as hereinabove defined. Examples of R and R¹ are shown in column 4, line 55 through column 5, line 34 of the Edwards patent hereby incorporated by reference. Among the preferred diamines are meta- and para-phenylene diamines, bis(4-aminophenyl)ether, benzidine, 2,2-bis(4'-aminophenyl) propane, bis(4-aminophenyl)methane, bis(4-aminophenyl)sulfone, bis(4-aminophenyl)sulfide, 1,6-hexamethylene diamine. Among the preferred dianhydrides are pyromellitic dianhydride, 2,2-bis(3',4'-dicarboxyphenyl)propane dianhydride, and bis(3,4-dicarboxyphenyl)ether dianhydrde; among the preferred mono-anhydrides is trimellitic anhydride.

The tertiary amines utilized in this invention for the purpose of salt formation with the polyamide acids are well known in the art. They can be e.g. simple trialkyl amines, hydroxy substituted trialkyl amines or mixtures thereof. The tertiary amines can be utilized alone or in combination but at all times there is at least sufficient amine to be stoichiometrically equivalent to the amount of free carboxyl groups in the polyamide acid to be neutralized. In one preferred embodiment a combination of triethylamine and diethyl 2-hydroxyethyl amine, in a ratio of 2 to 1 by weight is utilized to prepare the salt of the polyamide acid. Either one of these amines along can also be used but in said combination, and upon admixing the viscosity reducing agent and the coalescing agent, a higher solids content, lower viscosity aqueous solution of the polyamide acid salt results. A partial list of the tertiary amines, by no means limiting the invention to only these members of the class, is as follows: trimethyl amine, dimethyl ethanol amine, diethyl 2-hydroxyethyl amine, tributyl amine, tris(2-hydroxyethyl) amine, N,N-dimethylaniline, morpholine, triethylamine, pyridine, N-methyl pyrrole, ethyl bis(2-hydroxyethyl)amine, and mixtures thereof.

The polyamide acid salt is present in the range of 10–70% by weight of the aqueous solution and preferably 25–50%. At such concentration the solutions have practical application viscosities.

An essential ingredient of this invention comprises a viscosity reducing agent included in the water solution of the salt of the polyamide acid. Such viscosity reducing agents are organic liquids whose solubility parameters, $\delta_T$, fall within the range of 10–20.4 and which are miscible with water. A discussion of solubility parameters can be found in, for example, Kirk-Othmer, Encyclopedia of Chemical Technology, second edition (1963), pages 889–896. For purposes of this invention, the viscosity reducing agents are defined to have the following component parameters of the total solubility parameter, $\delta_T$:

| | |
|---|---|
| dispersion component, $\delta_D$ | 7.0–10.0 |
| polar component, $\delta_P$ | 2.0–11.0 |
| hydrogen bonding component, $\delta_H$ | 7.0–14.0 | wherein the equation $$\delta_T^2 = \delta_D^2 + \delta_P^2 + \delta_H^2$$

describes the relationship of the various components to the total solubility parameter.

Among useful viscosity reducing agents are included furfuryl alcohol, 1-butanol, 2-propanol, ethylene glycol monomethyl ether, triethylene glycol, formic acid, and mixtures thereof. A preferred viscosity reducing agent is furfuryl alcohol.

The viscosity reducing agent are present in amounts of 5 to 25% by weight, based on the total solution, and preferably 10 to 20% by weight for optimum viscosity/solids ratios, based on the total solution. While the exact mode of operation of this agent is not known one possible explanation of its beneficial effect on solution viscosity may be a solvating action to reduce the ionic and other polar interchain interactions.

A further important ingredient of the invention comprises a coalescing agent included in the aqueous solution of the polyamide acid-tertiary amine salt. Such coalescing agent is generally an organic liquid which can act as a solvent for the polyamide acid itself. The useful coalescing agents are highly polar organic liquids of relatively high boiling point; the boiling point being above 100° C. The following compounds can be utilized as coalescing agents: N-methylpyrrolidone, dimethyl formamide, dimethyl acetamide, dimethyl sulfoxide, cresylic acid, sulfolane, formamide or a combination thereof with N-methylpyrrolidone being a preferred one. These coalescing agents are present in amounts of 5 to 35% by weight, based on the total solution, and preferably 15 to 30% by weight, based on the total solution. The coalescing agents play an important role during the film forming step whereby uniform films of polyamide acids and/or polyimides are generated. During the film forming process heat is applied to facilitate removal of the salt forming amines which is followed by the imide-producing cyclization. These two steps are not necessarily sequential and some cyclization also takes place before all of the amine is evaporated. The coalescing agent keeps that portion of the polyamide acid in solution which would become insoluble in the aqueous medium during the evaporation of the tertiary amine and thereby prevents blistering the film.

The solutions of the polyamide acid precursors of the polyimide polymers are prepared by a process comprising mixing the polyamide acid with the tertiary amine followed by water, a viscosity reducing agent, and a coalescing agent. The order of mixing is not critical and any combination of the needed materials can be added as a solution in another ingredient, the choice of conditions depending on the particular polyamide acid being utilized. It is importaant, however, that there should be no prolonged contact of the polyamide acid with the water before the addition of a tertiary amine. This precaution is taken to avoid hydrolytic degradation of the polyamide acid. The speed of dissolution of the polyamide acid can be controlled by the choice of tertiary amine and/or viscosity reducing agent and/or coalescing agent utilized in the process. The same factors also control the final viscosity of the solution. The viscosity will also depend on the amount of polyamide acid desired to be dissolved in the solution. In general, the solution viscosity will range from 300 to 10,000 centipoises at 50° C and preferably will be between 800 and 3,000 centipoises at 50° C. The solids content of the polyamide acid solution will be between 10 and 70% by weight, based on the total solution, and preferably between 30 and 50% by weight for optimum coating thickness at practical viscosities.

The viscosity of the polyimide precursor solution can also be controlled by the temperature at which such solution is prepared, and lower viscosities can be obtained at elevated temperatures. Practically, however, there is an upper limit of about 70° C at which these solutions can be prepared; at about this temperature the precursor polyamide acid salts begin the process of amine loss and cyclization and such premature polyimide formation may be detrimental since the polyimides are insoluble in the medium.

The aqueous solutions of the polyamide acid precursors to polyimides of this invention can be used in a variety of applications. The solutions can be cast as films or applied as coatings to different substrates, for example, metals, such as copper, steel, etc.; polymeric materials such as cellulosic materials, polyolefins, etc.; glass, etc.; where the substrates can be in the form of sheets, fibers, foams, etc.

The solutions can be pigmented with such compounds as $TiO_2$ or compounded, for example, with perfluoroolefin polymers, such as polytetrafluoroethylene or copolymers of tetrafluoroethylene and hexafluoropropylene. The use of the aqueous solutions of this invention is advantageous when a perfluoroolefin polymer containing polyimide coating is desired. One can directly mix the aqueous perfluoroolefin dispersions, as they are customarily prepared, with the aqueous solution of the salt of the polyamide acids. The resulting dispersions, containing small particle size perfluoroolefin resins, yield finishes with better release properties than the coatings obtained by the general methods of the prior art which utilized organic solutions of the polyamide acids together with specially processed perfluoroolefins of large particle size. This large particle size is the unavoidable result of the special processing required in readying the perfluoroolefin polymers for use in the organic solutions.

The polyamide acid precursors can be converted to polyimides by methods known to those skilled in the art. Several such processes are shown, for example, in Edwards, U.S. Pat. No. 3,179,634, issued Apr. 20, 1965, at column 4, line 68 through column 5, line 41, hereby incorporated by reference.

The following examples illustrate this invention where all parts are by weight unless otherwise indicated.

EXAMPLE 1

The following ingredients are charged into a container: A polyamide acid prepared from trimellitic anhydride and bis(4-aminophenyl)methane, having an inherent viscosity (0.5% solution in N,N-dimethylacetamide) of 0.31 and a free acid content of 7.65% by weight, corresponding to 170 milliequivalents of carboxylic acid per 100 grams, 15 grams; water, 50 grams; diethyl 2-hydroxyethyamine, 4 grams; triethylamine, 2 grams; furfuryl alcohol, 18 grams; and N-methylpyrrolidone, 10 grams. After overnight agitation at room temperature a clear solution results, having a Brookfield viscosity (number 2 spindle, 20 revolutions per minute) of 600 centipoises. A portion of this solution is sprayed on an aluminum sheet and the sheet is placed in an oven for a pre-bake of 15 minutes at 150° C. This is followed by a final bake of 15 minutes at 315° C. There results a tough, hard, scratch-resistant film having adhesion to the metallic substrate. This film is clear and has a thickness of approximately 0.02 millimeter.

EXAMPLE 2

The following ingredients are placed in a container: The polyamide acid as described in Example 1, 74.9 grams; diethyl 2-hydroxyethylamine, 21.0 grams; triethylamine, 10.5 grams; furfuryl alcohol, 29.9 grams; and water 50.9 grams. The contents of the vessel are heated for 4 hours with agitation at between 55° and 70° C. At the end of this time period there results a clear solution to which is added N-methylpyrrolidone, 62.8 grams. Casting a film on a ceramic substrate, followed by a pre-bake and final bake as described in Example 1, results in a hard, clear, scratch-resistant film of good adhesion. Film thickness is 0.02 millimeter.

EXAMPLE 3

Into a 500-milliliter, round-bottomed, three-necked flask, equipped with thermometer, agitator, and condensor, are placed the following: A polyamide acid prepared from pyromellitic dianhydride and bis(4-aminophenyl)ether having a free acid content below 100 milliequivalents per 100 grams, 75 grams; diethyl 2-hydroxyethylamine, 32 grams; triethylamine, 16 grams; furfuryl alcohol, 50 grams; and water, 76 grams. The contents are heated for 18 hours at between 48° and 62° C whereupon a clear viscous solution results.

To this solution is added 50 grams of N-methypyrrolidone to afford a clear solution having a 25% solids content based on the polyamide acid. Coating and curing as described in Example 1 results in a hard, clear, scratch-resistant film on steel showing good adhesion and having a 0.02 millimeter thickness. When the solution, prior to the addition of the N-methyl pyrrolidone, is coated on a steel sheet and baked as described above these results an uneven, poorly coalesced film.

EXAMPLE 4

The following ingredients are placed in a container: The polyamide acid of Example 3, 20 grams; water, 31 grams; diethyl 2-hydroxyethylamine, 4 grams; triethylamine, 8 grams; N-methylpyrrolidone, 22 grams; and furfuryl alcohol, 15 grams. Agitation overnight results in a clear solution having a viscosity of approximately 700 centipoises measured on a Brookfield viscometer (number 2 spindle, 20 revolutions per minute). Drawing a copper wire through a bath of this solution followed by a 3-minute bake at 370° C results in a coating of approximately 0.002 millimeter thickness. Repeating this process five times affords a copper wire having an approximate 0.01 millimeter thickness. The resulting wire enamel shows excellent electrical insulating properties.

EXAMPLE 5

The following materials are placed in a container and agitated at room temperature for 24 hours: The polyamide acid of Example 1, 30 grams; water 31 grams; diethyl 2-hydroxyethylamine, 4 grams; triethylamine, 8 grams; N-methylpyrrolidone, 15 grams; and furfuryl alcohol, 12 grams. The resultant clear solution, when sprayed on an aluminum sheet and baked as described in Example 1, affords a scratch-resistant, clear film showing good adherence to the substrate.

What is claimed is:

1. A composition consisting essentially of an aqueous solution of
   A. 20 to 70% by weight, based on the solution, of a salt of a polyamide acid with a tertiary amine, wherein the polyamide acid is of the general formula

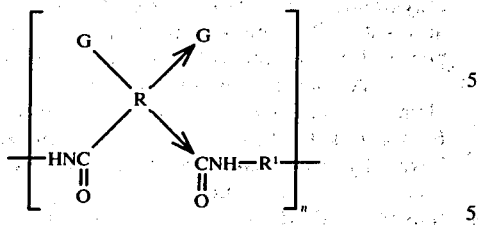

wherein one or both G radicals are hydrogen or a carboxyl; atoms and groups wherein → denotes isomerism so that in any recurring unit within the polymeric structure the groups to which the arrows point may exist as shown or in an interchanged position; wherein R is an organic tetravalent radical containing at least two carbon atoms and no more than two carbonyl groups of each polyamide acid unit are attached to any one carbon atom; wherein R¹ is a divalent radical containing at least two carbon atoms, the amide groups of adjacent polyamide acid units are attached to separate carbon atoms of said divalent radical; and wherein n is an integer sufficient to provide a polyamide acid having an inherent viscosity of 0.1–5.0, as measured as a 0.5% solution in N,N-dimethylacetamide at 30° C., and wherein said tertiary amine is present in at least a stoichiometrically equivalent amount to the free carboxylic acid groups in said polyamide acid;
   B. 5 to 25% by weight, based on the solution, of a viscosity reducing agent which is miscible with water and has a solubility parameter range of 10–20.4 wherein said solubility parameter has a dispersion component in the range of 7.0–10.0, a polar component in the range of 2.0–11.0, and a hydrogen bonding component in the range of 7.0–14.0;
   C. 5 to 35% by weight, based on the solution, of a coalescing agent, wherein said coalescing agent is at least one member selected from the group consisting of N-methylpyrrolidone, dimethyl formamide, dimethyl acetamide, dimethyl sulfoxide, cresylic acid, sulfolane, formamide; and wherein water comprises 30–80% by weight of the solution.

2. The composition of claim 1 wherein said polyamide acid is formed from at least one diprimary amine and at least one tetracarboxylic acid dianhydride.

3. The composition of claim 1 wherein said polyamide acid is formed from at least one diprimary amine and at least one tricarboxylic acid mono-anhydride.

4. The composition of claim 1 wherein said polyamide acid is formed from at least one diisocyanate and at least one dicarboxylic acid.

5. The composition of claim 1 wherein the tertiary amine is a mixture of triethylamine and diethyl 2-hydroxyethylamine.

6. The composition of claim 2 wherein said tetracarboxylic acid dianhydride is pyromellitic dianhydride and said diprimary amine is bis(4-aminophenyl)ether.

7. The composition of claim 3 wherein said tricarboxylic acid mono-anhydride is trimellitic anhydride and said diprimary amine is bis(4-aminophenyl)methane.

8. The composition of claim 5 wherein the coalescing agent is N-methylpyrrolidone and the viscosity reducing agent is furfuryl alcohol.

9. A composition consisting essentially of an aqueous solution of
   A. 10 to 70% by weight, based on the solution, of a salt of a polyamide acid with a tertiary amine, wherein the polyamide acid is of the general formula

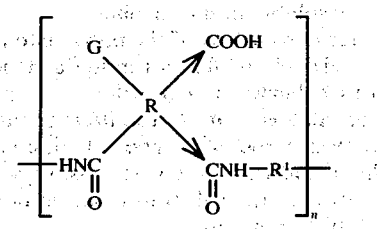

wherein G is a hydrogen atom or a carboxyl group; wherein the → denotes isomerism so that in any recurring unit within the polymeric structure the groups to which the arrows point may exist as shown or in an interchanged position; wherein R is an organic tetravalent radical containing at least two carbon atoms and no more than two carbonyl groups of each polyamide acid unit are attached to any one carbon atom; wherein $R^1$ is a divalent radical containing at least two carbon atoms, the amide groups of adjacent polyamide acid units are attached to separate carbon atoms of said divalent radical; and wherein n is an integer sufficient to provide a polyamide acid having an inherent viscosity of 0.1, 5.0, as measured as a 0.5% solution in N,N-dimethylacetamide at 30° C., and wherein said tertiary amine is present in at least a stoichiometrically equivalent amount to the free carboxylic acid groups in said polyamide acid;
  B. 5–25% by weight, based on the solution, of a viscosity reducing agent, wherein said viscosity reducing agent is furfuryl alcohol;
  C. 5–35% by weight, based on the solution, of a coalescing agent, wherein said coalescing agent is N-methyl pyrrolidone; and wherein water comprises 30–80% by weight of the solution.

10. The composition of claim 9 consisting essentially of
  A. 20–40% by weight, based on the solution, of a salt of a polyamide acid with tertiary amine, wherein the polyamide acid is formed from pyromellitic dianhydride and bis(4-aminophenyl)ether and wherein the tertiary amine is a 4:1 to 1:4 by weight mixture of triethylamine and diethyl 2-hydroxyethylamine;
  B. 10–20% by weight, based on the solution, of furfuryl alcohol;
  C. 20–30% by weight, based on the solution, of N-methylpyrrolidone;
and wherein water comprises 30–50% by weight of the solution.

11. The composition of claim 9 consisting essentially of
  A. 25–45% by weight, based on the solution, of a salt of a polyamide acid with tertiary amine, wherein the polyamide acid is formed from trimellitic anhydride and bis(4-aminophenyl)methane and wherein the tertiary amine is a 4:1 to 1:4 by weight mixture of triethylamine and diethyl 2-hydroxyethylamine;
  B. 10–20% by weight, based on the solution, of furfuryl alcohol;
  C. 10–25% by weight, based on the solution, of N-methylpyrrolidone;
and wherein water comprises 30–55% by weight of the solution.

* * * * *